United States Patent [19]
Kleinwächter

[11] Patent Number: 4,893,611
[45] Date of Patent: Jan. 16, 1990

[54] SOLAR ENERGY COLLECTION AND STORAGE APPARATUS

[75] Inventor: Jürgen Kleinwächter, Kandern-Egisholz, Fed. Rep. of Germany

[73] Assignee: Ulrich Luboschik, Fed. Rep. of Germany

[21] Appl. No.: 271,214

[22] Filed: Nov. 14, 1988

[51] Int. Cl.$^4$ .............................................. F24J 2/20
[52] U.S. Cl. ................................... 126/437; 126/435; 126/422
[58] Field of Search ............... 126/435, 436, 437, 432, 126/415, 416, 426, 450, 441, 422

[56] References Cited

U.S. PATENT DOCUMENTS

| 4,169,460 | 10/1979 | Popovich et al. | 126/422 |
| 4,227,511 | 10/1980 | Margen et al. | 126/415 |
| 4,241,724 | 12/1980 | Hull | 126/436 |
| 4,475,535 | 10/1984 | Assaf | 126/437 |

FOREIGN PATENT DOCUMENTS 2657244 7/1977 Fed. Rep. of Germany .

Primary Examiner—James C. Yeung
Assistant Examiner—Christopher Hayes
Attorney, Agent, or Firm—Browdy & Neimark

[57] ABSTRACT

In an apparatus for collecting and storing solar energy, in order to improve the efficiency while maintaining a simple structure, a storage container is divided horizontally into a smaller upper water volume and a larger lower water volume by means of an intermediate bottom, and a device for attaining thermal equalization between the upper volume and the top of the lower volume is provided. This device is preferably embodied by a pump, which draws water from the upper volume and delivers it to the lower volume, and for volumetric equalization, a line penetrating the intermediate bottom is provided.

5 Claims, 1 Drawing Sheet

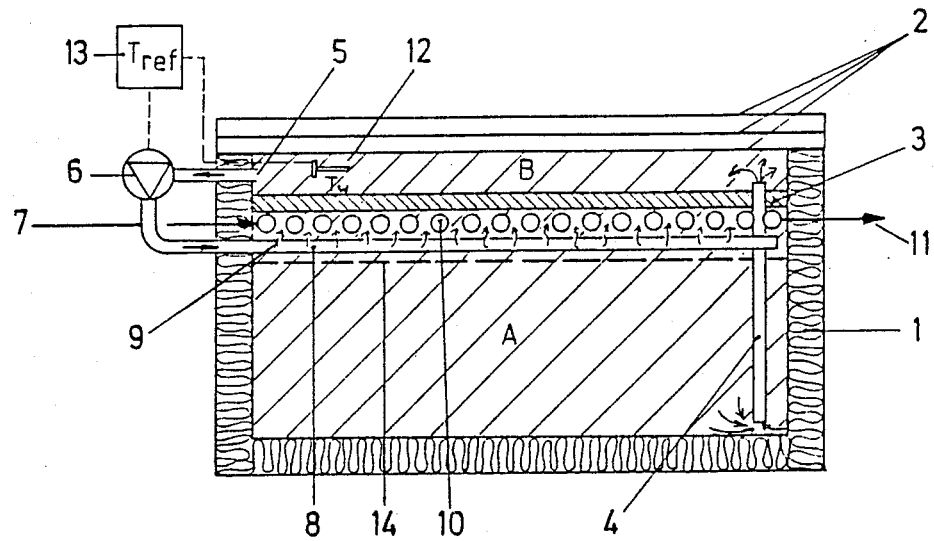

SOLAR ENERGY COLLECTION AND STORAGE APPARATUS

BACKGROUND OF THE INVENTION

1. Field of the Invention

The invention is directed to a solar energy collection and storage apparatus including a storage container having a transparent covering and a dark absorbent bottom, as well as supply and offtake lines for fresh and household or industrial water.

2. The Prior Art

The discontinuous availability of sunlight makes storage equipment or reservoirs indispensable for autonomous systems or those that use the energy optimally. This is also true for the field of solar hot water production.

Especially in the period since 1973, variants of such solar hot water systems have been developed in virtually all the industrially developed countries. In principle, these systems can be classified as either large-surface-area systems with reservoirs of high volume and long storage time, or smaller systems with smaller reservoirs and a shorter storage time.

For economic reasons, variants in both classifications have recently appeared that feature a compact unit combining a solar energy collector and reservoir. In the field of the large systems, what is known as solar ponds have been developed, while in the field of smaller systems, combined collection and storage collectors, known as internal storage collectors, have been developed.

Solar ponds are based on a physical effect, discovered about 1900 in Hungary and technically improved in the 1950s in Israel (particularly by Tabor, et al.), according to which the surface water in a pond several meters deep is fresh water, while the layers below it are salt water, which increases in concentration toward the bottom. The sunlight penetrating to the dark bottom is absorbed there and converted into heat, but cannot—unlike the situation in typical freshwater ponds—be transported by convection to the surface, because the layers of water at the bottom are heavier. In this way, the lower portion of the solar ponds heats up and is relatively well insulated thermally by the fresh water layers located above it. The useful heat is then drawn from the lower portion of the solar pond, using a heat exchanger.

In practice, such solar ponds are used for instance to drive thermodynamic machines with drive fluids having a low boiling point; because of their function of solar energy storage around the clock, they can be used to produce mechanical energy or electric current even in periods of bad weather, if the solar pond is suitably dimensioned.

The internal storage collectors, in the simplest case, comprise black water-filled containers located inside an outer container that provides good insulation, the surface which is facing the sun may be provided with one or more glazed windows. The water that heats up in the interior of the black container may be delivered to the consumer either via heat exchangers or directly. An arrangement of this kind is known for instance from German Pat. No. 26 39 425.

Although the basic simplicity in design of the arrangements described greatly facilitates their actual manufacture, nevertheless they have very serious disadvantages, in particular because they still have a very low efficiency.

The substantial disadvantage of solar ponds is that at typical depths of three meters, the useful energy available at the bottom of the solar pond is only about 35%, because of the extinction of the longer-wave portion in the solar spectrum; this directly limits the maximum possible efficiency. Moreover, the stratification of such solar ponds with layers of salt water counterracts natural convection and must therefore be continuously maintained by pump circulation in order to keep the gradient constant. Finally, the free surface of the water is very vulnerable to the wind, especially when the surface area is large, as is desired, because the waves produced by the wind disrupt the stratification of the water layers and cause losses.

The substantial disadvantage of internal storage collectors is the great thermal inertia of the volume of water to be heated. Precisely in climatic regions having a fluctuating amount of sunshine, collectors of relatively small thermal capacity are advantageous, because they already furnish the required useful temperatures when the periods of sunshine are short. Storage collectors of the classic type are therefore limited in their use to countries that have a great deal of sunshine, and even then can be used only for applications in which hot water is not needed until the second half of the day.

This basic shortcoming of the system can be partly overcome, for example by isothermal heating in a storage collector of variable volume, such as that described in European patent application Ser. No. 0 219 566.

In this previously known arrangement, solar energy is absorbed continuously through an absorber hose that is transparent at the top and dark at the bottom; the fill level of the storage collector varies as function of the desired set temperature and the intensity of the incident sunshine. The system is now no longer thermally sluggish, and it operates at high efficiency. However, the water in the collector hose is not under pressure and must be brought to useful pressure with a supplementary pump. The heat losses of the reservoir toward the top are limited by a transparent insulation, but the the system still does not attain the insulating properties of nontransparent insulating materials such as polyurethane foam.

SUMMARY OF THE INVENTION

With this as its point of departure, the object of the present invention, while retaining a combined solar collector and storage apparatus of simple structure, is to provide for maximum possible collecting efficiency with respect to the incident solar spectrum, isothermal heating of the integrated reservoir volume, optimal thermal insulation of the reservoir volume, and the possibility of drawing heat from the pressureless reservoir volume through a heat exchanger acted upon by pressure.

This object is attained by embodying the dark bottom as an intermediate bottom dividing the container horizontally into a smaller upper water volume and a larger lower water volume, and by providing a device for attaining an equalization of heat between the upper volume and the top of the lower volume.

The device for heat equalization is embodied for instance by a pump arrangement that draws water from the upper volume and delivers it to the top of the lower volume, and at least one connecting line penetrating the intermediate bottom.

By means of this configuration, the smaller upper volume will heat up even with weak or brief sunshine, and this heated water is then moved for storage into the vicinity immediately below the intermediate bottom. There, the warm water can be stored with little loss, because of the good thermal insulating properties of the intermediate bottom that can be attained. Moreover, by means of the connecting lines, it is attained that when warm water is drawn from the upper, smaller volume, cold water will automatically follow after it from the bottom of the colder volume.

A favorable provision that a temperature sensor is assigned to the upper volume, and a comparison device is assigned to the sensor so that the temperature measured with the sensor can be compared with a pre-settable reference temperature; the pump of the pump arrangement is switched on whenever the measured temperature attains the reference temperature. In this way, isothermal heating can be accomplished.

To attain a laminar inflow of the water pumped into the lower volume, so that the stratification in the lower volume is disturbed as little as possible, the pump arrangement is followed by a delivery device which extends below the intermediate bottom, parallel to and spaced apart by a slight distance from it over the entire width of the container, is closed at the end, and is provided at the top with a plurality of outflow openings which become larger along the pressure drop as a function of this pressure drop.

Alternatively, the delivery device may include an inlet plate, on top of which transverse slits are arranged, which become wider along the pressure drop as a function thereof.

To suppress turbulence, it may also be provided that a horizontal grating be located just below the delivery device. As an alternative to the pump and line arrangement for bringing about thermal equalization, this device may have at least one heat conducting tube having heat exchanger fins. In this case, the heat exchange takes place solely by thermal conduction, without actually transporting water.

For drawing the thermal energy, a variant of the invention provides that a heat exchange device is disposed below the intermediate bottom, incorporated into a secondary circulation loop. Heat exchanger coils of conventional construction are possible for this purpose, preferably those that are arranged relatively flat.

As an alternative, it is also possible for a hot water offtake line to be disposed below the intermediate bottom, and for a cold water delivery line to discharge at the bottom of the lower volume, to compensate for the quantity of water taken out.

To store larger quantities of heat, it may be provided that the container is embodied as a float container anchored in a body of water. Such containers can be disposed in lakes and ponds, to store extraordinarily large volumes and thus considerable quantities of heat. It had already been recognized previously that by means of reservoirs disposed in bodies of water, considerable quantities of heat can be stored, for example to supply homes located in the vicinity with hot water and household water. However, it was previously assumed that heating of the reservoir volume would have to be accomplished by means of external collectors. By the embodiment according to the invention, a very economical combination of collector and reservoir is now devised.

For some applications, a particularly simple embodiment may be provided in which the intermediate bottom is embodied as a metal plate, which is dark on the top and can be covered by a heat insulating device as a function of sunshine. Such a metal plate reliably prevents turbulence of the two reservoir regions of different temperature and brings about the desired temperature stratification. The thermal conductivity of the metal plate per se enables conduction of heat between the reservoir regions, so that in this sense no separate device need be provided. In order to attain sufficient insulation of the same time, whenever there is no sunshine, especially at night, a correspondingly activatable covering is provided.

To attain good heat transmission, heat dissipation or conducting ribs can be provided on the underside of the metal plate, extending away from it. With these heat conducting ribs, such as those used in a similar configuration in electronic components with a high line consumption, good thermal conduction can be attained.

The variable heat insulating device can favorably include a plurality of adjustable insulating plates. These insulating plates may be arranged i a row, in the manner of a segmented roll-up window shutter of the type used in Germany, and drawn over the metal plate, or preferably they may be supported pivotably in such a manner that they can be pivoted from a covering and insulating position into a position in which they allow sunshine to penetrate. In particular, the plates may be made reflective on the surface. In the sunshine penetration position, it may be provided that the plates extend such that they reflect in the east-west direction and form a kind of mirror groove (booster mirror grooves), which weakly concentrate the sunlight without having to track the sun. In this way, effective exploitation of the solar energy is possible, especially in regions with little sunshine.

In accordance with a further characteristic of the invention this may advantageously be done by making the adjustment using so-called memory metals. These memory metals, which have been developed recently, are provided with a lattice structure, such that once a configuration has been imposed upon them, they resume it, after a temperature change and temporary deformation, whenever the original temperature is again established. This property can be very well exploited in order to adjust the thermal insulation, in particular of corresponding plates, as a function of the temperature, because in that case not only separate sensors but drive motors as well can be dispensed with, and the entire arrangement accordingly becomes completely maintenance-free, which appears extremely desirable for putting the invention to practical use.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWING

Further characteristics, advantages and details of the invention will become apparent from the ensuing description of an exemplary embodiment, referring to the drawing, in which:

The drawing shows a schematic sectional view of an apparatus according to the invention.

DETAILED DESCRIPTION OF THE PREFERRED EMBODIMENT

In the drawing, a container 1 having an insulating outer wall is shown. This container may be embodied by the natural or artificial wall of a pond, in an embodiment as a kind of solar pond, or else by an insulating container wall of virtually arbitrary size, in an embodiment as an internal storage collector. In the exemplary embodiment, the top of the container 1 is closed and hence thermally insulated by three transparent layers of a transparent film.

A bottom which is dark on its top and hence absorbs thermal gradiation is embodied as an intermediate bottom 3 and extends horizontally transversely across the container 1, so that two volumes of water separated from one another are formed, the lower water volume A being greater than the upper water volume B. A line 4 penetrates the intermediate bottom 3 and connects the underside of the lower, larger volume A with the upper, smaller volume B. An outlet line 5 leads from the upper volume B to a pump 6, from which a return line 7 extends, discharging into a delivery device 8. The delivery device 8 is embodied by at least one tube closed at the ends and extending horizontally, transversely to and below the intermediate bottom 3, and having a plurality of outlet openings 9 through which water that gas been fed in can escape upward with as little turbulence as possible. Below the intermediate bottom 3, coils 10 of a heat exchanger that is incorporated into a secondary circulation loop indicated by the arrow 11 extend in a parallel, horizontal plane. A temperature sensor 12 is disposed in the upper volume B and connected to comparison device 13, which, although not shown in detail, has a device for setting a reference temperature $T_{ref}$ and compares it with the actual temperature $T_w$ ascertained by the temperature sensor 12 and triggers the pump 6 as a function of this comparison.

The pump is switched on whenever the temperature $T_w$ detected by the temperature sensor 12 drops below the set reference temperature $T_{ref}$.

When sunlight reaches it, the upper water volume heats up very rapidly, because of its small quantity and the complete extinction of the light, partially in the water and partially at the dark intermediate bottom 3. This heated water, when the pump 6 is switched on, is stratified in laminar fashion via the delivery device 9 underneath the intermediate bottom 3, and mixing of the water is counteracted not only by the laminar inflow but also by a horizontal intermediate grating 14.

A corresponding volume equalization for the water pumped out by the pump 6 is performed via the line 4, which forms a riser pipe. The lower end of this line 4 discharges at the coldest point in the lower volume A, in fact, in order to avoid a "short circuit" between warm and cold water, at the side of the container 1 opposite the return line 7. As indicated by the arrows in the drawing, the water flows upward into the small volume B.

The laminar, non-mixing delivery of warm water directly below the intermediate bottom 3 leads to a quasi-isothermal heating. If no warm water is drawn from the reservoir, the warm water layer gradually spreads downward into the reservoir volume, until this volume is completely filled with warm water. With the above-described basic apparatus, virtually the entire solar spectrum is exploited, because besides the small portion of the spectrum that is absorbed or reflected by the transparent layers 2, all the light is converted into useful heat either directly in the water or at the dark top of the intermediate bottom 3. The transparent covering 2 prevents wind from affecting the surface of the water. The stratification of the water is attained without salt water, because of the natural stratification below the intermediate bottom 3.

If the reservoir is not discharged through a heat exchanger, as in the exemplary embodiment described above, but instead the hot water is taken off directly, for instance via a pump, then care must be taken that cold water will automatically flow in after it at the bottom of the storage container, regulated by a fill level monitor, whenever hot water is drawn off. According to a variant, which is again highly advantageous on its own, the apparatus according to the invention can also be used to produce and store cold water. Then the pump 6 is put into operation only at night. During the night, the volume B radiates heat through the "atmospheric window" to the cold night sky in the wavelength range from 8 to 13 $\mu$m. The water cools down as a result, and upon attaining a reference temperature detected by the temperature sensor 12 is pumped without turbulence by the pump 6, via the return line 7, into the lowermost part of the storage volume A. The inflow configuration selected is the mirror image of the inflow configuration described in connection with the drawing. It assures that a layer of cold water that spreads continuously upward will form on the bottom. The line 4, which serves to equalize the bottom between the volumes A and B, is substantially shorter in this variant and terminates directly below the intermediate bottom 3. Moreover, a multiple transparent covering of the volume B is intentionally omitted here, and instead a provision is made for a covering that is as transparent as possible. If a covering is omitted entirely, then the effect of evaporative cooling occurs as well, but this means that the resultant water flow must be compensated for.

In this apparatus, if cold water is drawn by means of a heat exchanger disposed in that case at the bottom of the volume A, then the originally stable stratification becomes unstable, analogous to the variant for hot water production. Because of the heating in the immediate vicinity of the heat exchanger, warm water rises, causing circulation currents, which improve the heat exchange performance.

This last variant may be used on the one hand purely for cooling purposes, for instance to air condition homes in hot countries, or on the other hand can be used in combination with hot water producing storage collectors in order to improve the usable temperature drop and hence the efficiency of thermodynamic machines with low-boiling-point working fluids as well.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An apparatus for the collection and storage of solar energy, comprising:

a storage container having a transparent covering, a dark absorbent bottom, and delivery and offtake lines for fresh and industrial and household water, said dark bottom comprising thermally insulating intermediate bottom dividing the container horizontally into a smaller upper water volume and a larger lower water volume; and a device for attaining a thermal equalization between the upper volume and the top of the lower volume wherein the device for thermal equalization comprises a pump apparatus for drawing water from the upper volume and delivering water to a top portion of the lower volume, and at least one connecting line penetrating the intermediate bottom.

2. An apparatus as defined by claim 1, further comprising a temperature sensor associated with the upper volume, a comparison device connected to said sensor for comparison of the temperature ($T_w$) measured by the sensor with a presettable reference temperature ($T_{ref}$), wherein a pump in the pump apparatus is switched on whenever the measured temperature ($T_w$) attains the reference temperature ($T_{ref}$).

3. An apparatus as defined by claim 2, further comprising a delivery device downstream from said pump apparatus, which extends below the intermediate bottom spaced apart by a slight distance from and parallel to the intermediate bottom over substantially the entire width of the container, the delivery device having closed ends, and provided on a top surface with a plurality of outflow openings that as a function of the pressure drop become larger along the pressure drop.

4. An apparatus as defined by claim 2, wherein the delivery device includes an inlet plate on the top of which transverse slits, which become wider as a function of the pressure drop, are disposed along the pressure drop.

5. An apparatus as defined by claim 3, further comprising a horizontal grating counteracting the production of turbulence disposed just below the delivery device.

* * * * *